Oct. 11, 1938.        B. S. AIKMAN        2,132,916
BRAKE CONTROL DEVICE
Filed Feb. 17, 1933       2 Sheets-Sheet 1

INVENTOR
BURTON S. AIKMAN
BY
ATTORNEY

Oct. 11, 1938.  B. S. AIKMAN  2,132,916
BRAKE CONTROL DEVICE
Filed Feb. 17, 1938  2 Sheets-Sheet 2

INVENTOR
BURTON S. AIKMAN
BY
ATTORNEY

Patented Oct. 11, 1938

2,132,916

UNITED STATES PATENT OFFICE 2,132,916

BRAKE CONTROL DEVICE

Burton S. Aikman, Wilkinsburg, Pa., assignor to The Westinghouse Air Brake Company, Wilmerding, Pa., a corporation of Pennsylvania Application February 17, 1938, Serial No. 190,949

19 Claims. (Cl. 303—21)

This invention relates to brake control devices and has particular relation to brake control devices including equipment for guarding against sliding of the wheels on vehicles such as railway cars.

As is well known, when the braking force with which brake shoes are applied to retard the rotation of a vehicle wheel is sufficiently great to cause the coefficient of adhesion between the vehicle wheel and the road surface or rail on which the wheel rolls to be exceeded, the vehicle wheel slips, that is, decelerates rapidly toward a locked-wheel state. As employed herein, the term "slip" or "slipping" refers to rotation of a vehicle wheel at a speed less than a speed corresponding to vehicle speed and the time during which a wheel is slipping is referred to as the "slipping time" or "slipping period". The term "slide" or "sliding", as employed herein, refers to the dragging of a vehicle wheel along the rail in a locked-wheel state, as distinguished from the slipping of the wheel.

Various devices and mechanisms have been proposed which are responsive to the slipping of a vehicle wheel, for effecting a release of the brakes on the slipping wheel sufficiently rapidly to prevent the vehicle wheel decelerating to a locked-wheel state and thus permit the vehicle wheel to be restored to a speed of rotation corresponding to the vehicle speed without sliding.

It is an object of my present invention to provide a novel arrangement for releasing the brakes on a vehicle wheel substantially instantaneously upon the slipping of the vehicle wheel and thereby preventing the wheel from attaining a locked-wheel state and sliding along the rail.

More specifically, it is an object of my present invention to provide a novel arrangement including means responsive to the difference in the rotative speeds of two vehicle wheels, associated respectively with different axles, for initiating the release of the brakes on both of the wheels.

Still more specifically, it is an object of my invention to provide two pumps associated respectively with different wheel axles and operated in series relation in such manner as to produce pressure or partial vacuum in a chamber upon the attainment of a predetermined differential in the rotative speeds of the vehicle wheels associated with the different axles, whereby the release of the brakes on the vehicle wheels associated with the axles is initiated.

Figure 1:
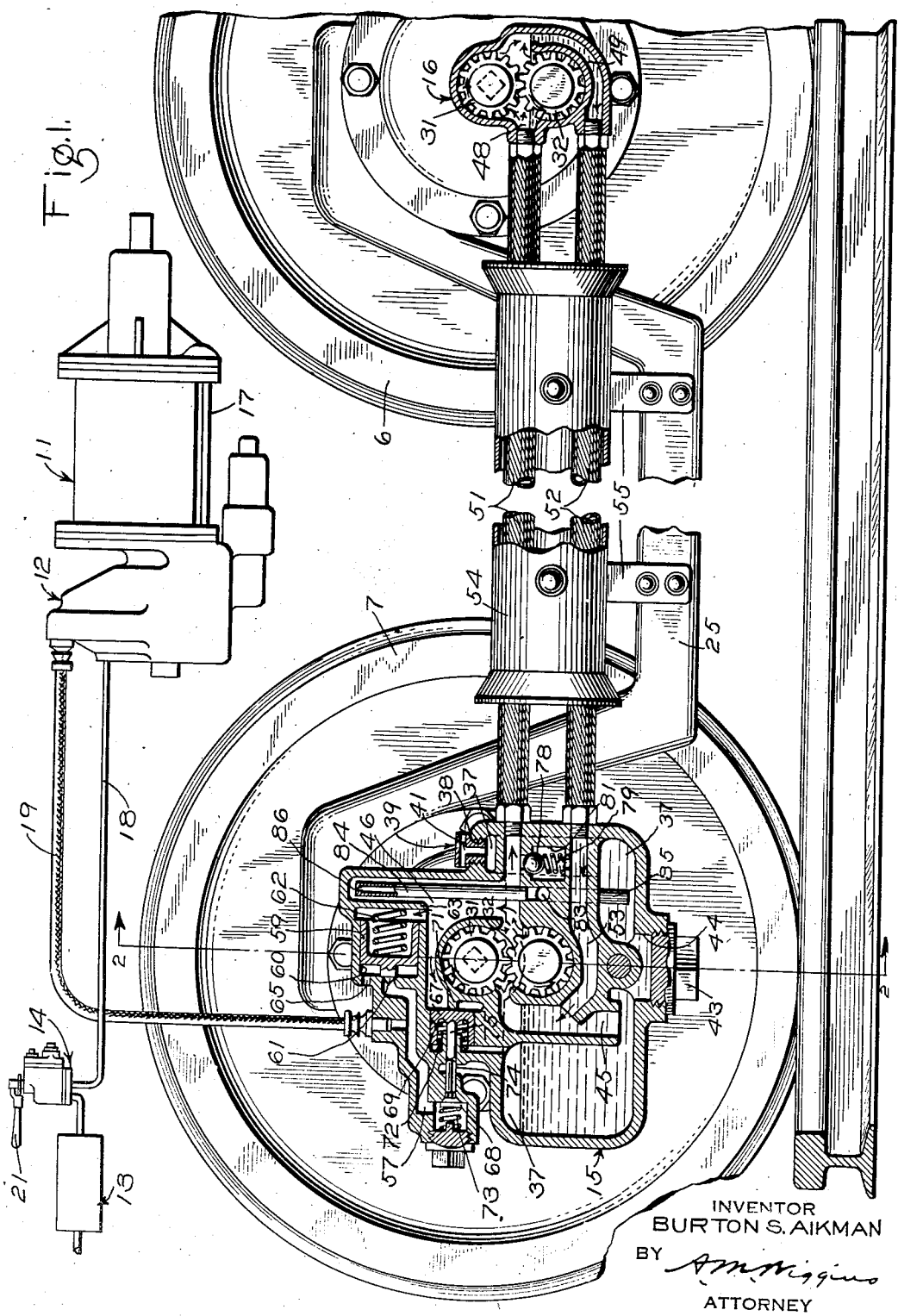
Figure 2:
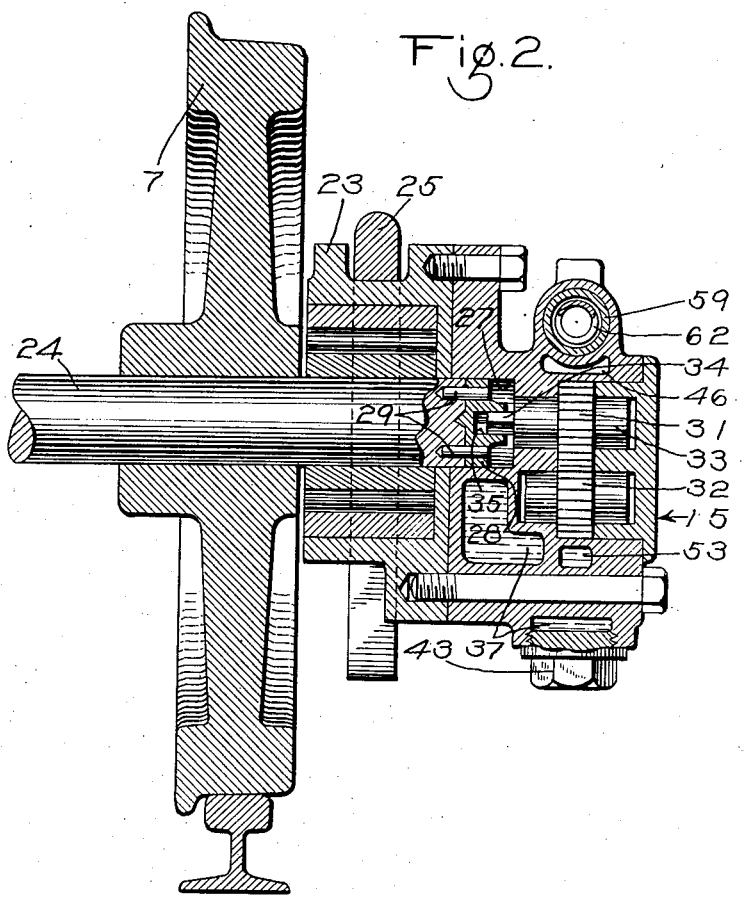

The above objects, and other objects of my invention which will be made apparent hereinafter, are attained by an illustrative embodiment of my invention subsequently to be described and shown in the accompanying drawings, wherein Fig. 1 is a diagrammatic view, with parts in section, showing the essential parts of a brake control equipment embodying my invention, and Fig. 2 is a sectional view, taken on the line 2—2 of Fig. 1 showing in further detail the arrangement of parts and the construction of the equipment shown in Fig. 1.

*Description of equipment*

The brake equipment shown in Fig. 1 is employed in connection with the forward and rear pairs of wheels 6 and 7 of a vehicle wheel truck (only one wheel of each pair being shown) and includes a brake cylinder 11 for effecting application of the brakes on the wheels 6 and 7. Associated with the brake cylinder 11 is a valve unit 12 of the type described in detail and claimed in my copending application Serial No. 176,184, filed November 24, 1937, and assigned to the same assignee as is the present application. The equipment also includes a source of fluid under pressure, such as a main reservoir 13 and a self-lapping manually operative brake valve 14 of the type described in detail and claimed in Patent 2,042,112 of Ewing K. Lynn and Rankin J. Bush.

According to my invention, the equipment further includes a pump and valve unit 15 associated with and operated by rotation of the axle of the rear wheels 7, and a pump unit 16 associated with and operated by rotation of the axle of the forward wheels 6 of the wheel truck.

Considering the parts of the equipment in greater detail, the brake cylinder 11 contains the usual piston, not shown, which is shifted in response to the pressure of fluid supplied to the usual pressure side of the piston to effect application of the brake shoes, not shown, to the vehicle wheels 6 and 7 through intervening rods and levers in a well known manner. As described in my copending application, mentioned above, the space on the usual pressure side of the brake cylinder piston is connectable with the space on the opposite or usual non-pressure side of the piston under the control of the valve unit 12, fluid under pressure flowing to the non-pressure side of the brake cylinder piston as through a pipe 17 connecting the flanges at opposite ends of the brake cylinder.

In view of the complete description of valve unit 12 given in my copending application, mentioned above, only a brief description of the functions performed by the valve unit is deemed necessary herein. The valve unit 12 normally establishes communication from a supply pipe 18 to the usual pressure side of the brake cylinder piston and closes communication between the usual pressure and non-pressure sides of the brake cylinder piston. With the valve unit 12 thus normally conditioned, fluid under pressure may be supplied to and released from the usual pressure side of the brake cylinder piston through supply pipe 18 under the control of brake valve 14, so that application and release of the brakes may be effected in the conventional manner by the operator of the vehicle.

Connecting the valve unit 12 and the pump and valve unit 15 is a so-called trigger pipe 19 which is charged with fluid under pressure according to the pressure established in the supply pipe 18 while the valve unit 12 is in its normal condition. Upon a sudden reduction of the pressure in trigger pipe 19, without reduction of the pressure in supply pipe 18, the valve unit 12 is operated to first close the communication from the supply pipe 18 to the usual pressure side of the brake cylinder piston and then to establish communication between the usual pressure and non-pressure sides of the brake cylinder piston. The fluid pressure on the pressure side of the brake cylinder piston is accordingly reduced to the pressure of equalization with the pressure established on the non-pressure side of the brake cylinder piston by flow of fluid under pressure from the pressure side to the non-pressure side of the brake cylinder piston. When the fluid pressure on the opposite sides of the brake cylinder piston thus becomes substantially equalized, the usual release spring, not shown, and associated with the brake cylinder piston, returns the piston to its release position and the brakes on the wheels 6 and 7 are thus released.

When fluid pressure is again restored in trigger pipe 19, valve unit 12 operates to first close the communication between the pressure and non-pressure sides of the brake cylinder piston and then open an exhaust communication through which the fluid under pressure on the usual non-pressure side of the brake cylinder piston is vented, reapplication of the brakes on wheels 6 and 7 being thus effected.

Valve unit 12 is not responsive to restoration of fluid pressure in trigger pipe 19, however, to restore the communication between the supply pipe 18 and the pressure side of the brake cylinder piston. Consequently, the reapplication of the brakes effected by the release of fluid under pressure from the usual non-pressure side of the brake cylinder piston is limited to a degree corresponding to the reduced pressure remaining on the usual pressure side of the brake cylinder piston. As a result, when the sudden reduction of the pressure in the trigger pipe 19 is initiated upon slipping of a vehicle wheel, as will be described hereinafter, the reapplication of the brakes on the vehicle wheels is limited to a degree less than that which initiated the slipping and, thus, the possibility of recurrence of slipping of the vehicle wheels is substantially eliminated.

A further operating characteristic of the valve unit 12 is that the venting of fluid under pressure from the usual non-pressure side of the brake cylinder piston is delayed to insure restoration of a slipping vehicle wheel back to a speed corresponding to vehicle speed before reapplication of the brakes becomes effective, thus additionally insuring against the recurrence of wheel-slipping.

In view of the complete description of the self-lapping brake valve 14 given in the above mentioned Patent 2,042,112, it is deemed unnecessary to describe the brake valve 14 in detail herein. Briefly, however, it comprises a self-lapping valve mechanism operative upon rotation of the operating handle 21 out of a normal release position thereof into an application zone to establish a pressure in the supply pipe 18 corresponding to the degree to which the operating handle is displaced out of its normal position. When the operating handle is in its normal release position, the supply pipe 18 is vented to atmosphere at the brake valve and the supply of fluid under pressure from the reservoir 13 is cut off.

As seen more clearly in Fig. 2, the pump and valve unit 15 comprises a casing which is bolted or otherwise suitably secured to the external face of the journal 23 at the outside end of the axle 24 of the wheel 7 on which is suitably supported and guided a truck side frame member 25 of conventional construction.

The casing of the pump and valve unit 15 has formed therein in coaxial relation to the axle 24 a bore 27 in which the outer end of the axle 24 is partially received. Secured to the outer end of the axle 24 and properly centered as by a centering projection is an adapter disk 28 which may be secured to the axle 24 for rotation therewith by a plurality of pins 29.

Embodied in the casing of the pump and valve unit 15 is a gear type pump comprising two cooperating intermeshed gear wheels 31 and 32. The shaft 33 of the gear wheel 31 is suitably journaled in the casing in coaxial alignment with the axle 24 and has a squared projection 34 at one end which extends into a conforming recess 35 in the adapted disk 28. Accordingly, the gear wheel 31 of the pump is rotated at a speed and in the direction of rotation of the wheel 7 and axle 24, while the gear wheel 32 of the pump is rotated in the opposite direction.

The casing of the pump and valve unit 15 has formed therein at the lower portion thereof a storage chamber 37 for liquid such as oil, a supply of liquid being admitted to the storage chamber 37 through a filling opening 38. A removable plug 39 is provided for the filling opening and has breather ports 41 therein for maintaining the pressure in the storage chamber 37 at atmospheric pressure. At the bottom of the casing is an opening 44 through which the liquid in the chamber 37 may be drained, a suitable removable plug 43 for the opening 44 being provided. The portion of the casing for supporting the pump gear wheels is arranged to extend downwardly into the storage chamber 37 and contains an intake passage 45 which is open at its lower end adjacent the bottom of the storage chamber 37 and at its upper end adjacent the point at which the two gear wheels 31 and 32 intermesh.

The casing closely confines the gear wheels 31 and 32 in suitable arcuate grooves or recesses each open at one end to the intake passage 45 and at the opposite end to a so-called discharge chamber 46 in the casing. Accordingly, upon rotation of the gear wheels 31 and 32 in the direction indicated by the arrows in Fig. 1, the liquid which rises in the intake passage 45 to the height in the storage chamber 37 is withdrawn from the intake passage 45 and forced by the teeth of the gear wheels 31 and 32 through the corresponding arcuate grooves and delivered into the discharge chamber 46.

The pump 16, associated with the axle of the forward vehicle wheel 6, is similar in construction to the gear pump of the pump and valve unit 15 and comprises a gear wheel 31 secured to and rotatable with the axle of the wheel 6, in the manner of the gear wheel 31 and the axle 24 of the wheel 7, and an intermeshing gear wheel 32 corresponding to the gear wheel 32 of the pump valve unit 15. The casing of the pump 16 is suitably formed to provide an intake passage or chamber 48 and a discharge chamber and passage 49.

The discharge chamber 46 of the pump and valve unit 15 is connected to the intake chamber 48 of the pump 16 through a suitable flexible tube or pipe 51 and the discharge passage 49 of the pump 16 is connected by a suitable flexible tube or pipe 52 to a return passage 53 in the casing of the pump valve unit 15 which opens upwardly into the intake passage 45.

A suitable supporting and protecting sleeve element 54 is provided for the flexible pipes 51 and 52, the sleeve being secured, as by brackets 55, to the side frame 25 of the vehicle wheel truck.

It will thus be seen that the liquid discharged into the discharge chamber 46 of the pump and valve unit 15 flows through the pipe 51 to the intake chamber 48 of the pump 16 which, in turn, returns it through the pipe 52 to the intake passage 45 of the pump and valve unit 15. If the forward and rear vehicle wheels 6 and 7 are rotating at the same speed, the pump 16 returns liquid to the intake passage 45 as rapidly as it is withdrawn therefrom by the pump of the pump and valve unit 15. In such case, the pressure in the discharge chamber 46 of the pump and valve unit 15 is not increased from the normal substantially atmospheric pressure therein.

If the forward vehicle wheel 6 rotates at a speed less than the speed of rotation of the rear vehicle wheel 7, the pump of the pump and valve unit 15 delivers liquid to the pump 16 faster than the pump 16 can return it to the intake passage 45 and, consequently, the liquid pressure in the discharge chamber 46 of the pump and valve unit 15 is increased above the normal pressure therein.

In a similar manner, if the rear vehicle wheel 7 rotates at a speed less than the rotative speed of the forward wheel 6, the pump of the pump and valve unit 15 cannot deliver liquid to the pump 16 as rapidly as it is discharged or returned by the pump 16 to the intake passage 45 and, consequently, a partial vacuum is produced in the discharge chamber 46 of the pump and valve unit 15.

The trigger pipe 19 opens into a passage 57 in the casing of the pump and valve unit 15 and valve mechanism, presently to be described, is provided for opening the passage 57 to atmosphere and thus effecting a sudden reduction of the pressure in the trigger pipe 19 upon a predetermined increase of pressure in the discharge chamber 46 or upon the creation of a predetermined partial vacuum in the discharge chamber 46.

For reducing the pressure in the trigger pipe 19 upon the production of a partial vacuum in the discharge chamber 46 of the pump and valve unit 15, a piston valve 59 operative in a suitable bore 60 in the casing of the pump and valve unit 15 is provided. The piston valve 59 has formed thereon a pin valve 61 which is urged into seated relation on an associated valve seat, formed on the casing, by a coil spring 62 interposed between the piston valve 59 and a lug 63 adjacent the end of the bore 60 in which the piston valve 59 operates. The space surrounding the pin valve 61 at the outer seated area thereof is constantly open to atmosphere through a vent port 65 and the pin valve 61 is thus adapted to control the exhaust of fluid under pressure from the passage 57 through the port 65. The face of the piston valve 59 on which the spring 62 acts is open to the discharge chamber 46 and thus upon the production of a partial vacuum in the discharge chamber 46, the atmospheric pressure acting on the outer seated area of the piston valve is effective to overcome the force of the spring 62 and unseat the pin valve 61 from its associated valve seat to cause fluid under pressure in the passage 57 to be vented suddenly to atmosphere through the exhaust port 65.

Fluid under pressure is also suddenly released from the passage 57 upon an increase in the pressure of the liquid pressure in the discharge chamber 46 by means of a movable abutment or piston 67 and a poppet valve 68 operated by the piston 67. The piston 67 is operative in a suitable bore 69 of the casing and is arranged to be subject on one side to the atmospheric pressure above the liquid in the storage chamber 37 and on the other side to the liquid pressure in the discharge chamber 46. When the pressure on opposite sides of the piston 67 is substantially equal, it is urged in the right-hand direction into engagement with a stop lug 71 formed on the casing within the discharge chamber 46 by a coil spring 72 interposed between the casing and the piston.

The poppet valve 68 is contained in the passage 57 and is normally urged into seated relation on an associated valve seat by a coil spring 73. The poppet valve 68 has a fluted stem 74 which is guidably supported in a suitable bore in the casing and which engages at the end thereof a stem 75 formed on the piston 67. The casing of the pump and valve unit 15 is formed so that the fluted stem 74 of the valve 68 is open to atmosphere along a portion thereof.

The length of the fluted stem 74 of the valve 68 and stem 75 of the piston 67 is such that when the piston 67 is urged in the right-hand direction into contact with the stop lug 71, the poppet valve 68 is seated. Upon an increase of the liquid pressure in the discharge chamber 46 sufficient to overcome the force of the spring 72, the piston 67 shifts in the left-hand direction and thus unseats the poppet valve 68. With valve 68 unseated, fluid under pressure is exhausted from the passage 57 and the connected trigger pipe 19 to atmosphere.

In order to prevent the development of excessive liquid pressure in the discharge chamber 46 of the pump and valve unit 15, a loaded check valve 78 is provided. The check valve 78 is illustrated as of the ball type and is loaded as by means of a coil spring 79 which urges the ball check valve into seated relation on an associated valve seat to close communication between the discharge chamber 46 and the return passage 53 through a passage 81. When the pressure developed in the discharge chamber 46 overcomes the force of the spring 79, the ball check valve 78 is unseated and the liquid pressure is thus relieved by flow of liquid through the passage 81 to the return passage 53 which, being in communication with the storage chamber 37, is at atmospheric pressure.

The vehicle wheels 6 and 7 are as a practical matter, not always of identically the same diameter due to unequal wear on the wheels, replacement of one wheel with a new wheel, and other causes. Thus, the wheels 6 and 7 may rotate, respectively, at slightly different speeds normally while the brakes are released. Consequently, a partial vacuum or an increase of liquid pressure may be developed normally in the discharge chamber 46 of the pump and valve unit 15 due to the difference in operating speeds of the two pumps. In order to prevent undesired reduction of the pressure in the trigger pipe 19, under the circumstances just described, a by-pass communication is provided between the discharge chamber 46 and the storage chamber 37 which prevents substantial variation from atmospheric pressure in the discharge chamber 46 unless the rotative speeds of the two vehicle wheels 6 and 7 differ by a substantial amount which would occur only in the event that either one of the wheels slips with respect to the other.

This communication is established by means of a passage 83 in the casing which is connected by a tube 84 to the discharge chamber 46 and by a tube 85 to the storage chamber 37. The tube 84 extends upwardly, terminating adjacent the uppermost part of the discharge chamber 46, and has a restricted port 86 at the upper end thereof. The tube 85 extends downwardly and is open at the lower end thereof adjacent the bottom of the storage chamber 37. The port 86 in the tube 84 is of sufficient size that liquid may flow therethrough from the discharge chamber 46 to the storage chamber 37 or from the storage chamber 37 to the discharge chamber 46 rapidly enough to prevent any substantial increase in the pressure or production of a partial vacuum in the discharge chamber 46 such as might be caused by the slight difference in diameters of vehicle wheels 6 and 7. When the difference in the rotative speeds of the two wheels 6 and 7 is greater than that due merely to the difference in diameters thereof, such as results from the slipping of one wheel with respect to the other, the port 86 so restricts the flow of liquid between the discharge chamber 46 and the storage chamber 37 as not to prevent the increase of liquid pressure in the discharge chamber or the production of a partial vacuum therein.

The communication between discharge chamber 46 and the storage chamber 37 through the passage 83 and tubes 84 and 85 serves the additional purpose of releasing air trapped in the upper portion of the discharge chamber 46 to atmosphere. It will be apparent that when the pump of the pump and valve unit 15 is initially operated and liquid is delivered to the discharge chamber 46, air is trapped in the discharge chamber 46 above the level of the liquid delivered into the chamber. Such trapped air may interfere with the proper operation of the piston valve 59 and of poppet valve 68 and is accordingly objectionable. It will be apparent that by causing the tube 84 to terminate at the uppermost portion of the discharge chamber 46, the slightest amount of air trapped in the discharge chamber may be released by flow through the tube 84, passage 83 and tube 85 to the storage chamber 37 where it may bubble upwardly through the liquid and discharge to atmosphere through the restricted breather ports 41 in the plug 39 secured in the filling opening 38.

Operation of equipment

Let it be assumed that the main reservoir 13 is charged to the normal pressure carried therein, as from a fluid compressor not shown, that the brake valve handle 21 is in its normal release position, that a supply of liquid is contained in the storage chamber 37 of the pump and valve unit 15 and that the vehicle is traveling along the road or track under power or coasting. With the brake valve handle 21 in its release position, the supply pipe 18 is vented to atmosphere and consequently fluid under pressure is released from the pressure side of the brake cylinder piston and the brakes are released.

If it is desired to effect an application of the brakes on the vehicle wheel 6 and 7, the operator first shuts off the power if the power is on and then shifts the brake valve handle 21 from its release position into the application zone to a desired degree. Accordingly, the self-lapping brake valve device 14 operates to supply fluid under pressure from the main reservoir 13 to the supply pipe 18 and by way of the valve unit 12 to the pressure side of the brake cylinder piston thereby effecting an application of the brakes to a degree corresponding to the displacement of the brake valve handle out of its release position.

As long as the vehicle wheels 6 and 7 continue to rotate at speeds corresponding to vehicle speed, the valve unit 12 is conditioned to establish communication between the supply pipe 18 and the pressure side of the brake cylinder piston and thus the degree of application of the brakes will be maintained unless the operator varies the degree of displacement of the brake valve handle 21 from its release position either to increase the degree or decrease the degree of the application.

If the degree of the application is such, or if the condition of the road surface or track rails is such, that the forward wheel 6 in the vehicle truck begins to slip, the resultant increase in the liquid pressure in the discharge chamber 46 of the pump and valve unit 15 causes unseating of the poppet valve 68 and the consequent reduction of pressure in the trigger pipe 19. As a result, the valve unit 12 is operated to cut off the further supply of fluid under pressure from the supply pipe 18 and to establish communication through which the pressure on the usual pressure side of the brake cylinder piston is equalized to the space in the brake cylinder on the usual non-pressure side of the brake cylinder piston. This equalization of pressure on opposite sides of the brake cylinder piston occurs so rapidly that the brakes on the vehicle wheels 6 and 7 are released substantially completely before the vehicle wheel 6 attains the locked-wheel state. Accordingly, upon the release of the brakes the vehicle wheel 6 begins to accelerate back toward a speed corresponding to vehicle speed.

When the vehicle wheel 6 attains a speed corresponding substantially to vehicle speed, the liquid pressure in the discharge chamber 46 of the pump and valve unit 15 is correspondingly reduced to its normal substantially atmospheric pressure and, as a result, the poppet valve 68 is reseated. As explained in my above-mentioned copending application, the valve unit 12 now operates to recharge the trigger pipe 19 at a slow rate and, when the pressure in the trigger pipe is restored sufficiently it operates to vent fluid under pressure from the usual non-pressure side of the brake cylinder piston without reopening the communication through which fluid under pressure is supplied from the supply pipe 18 to the pressure side of the brake cylinder piston. Thus, the brakes are reapplied on the vehicle wheels 6 and 7 at a reduced degree corresponding to the reduced pressure maintained on the usual pressure side of the brake cylinder piston. Accordingly, as previously indicated, due both to the delay in effecting reapplication of the brakes and to the reduced degree to which the brakes are reapplied, the likelihood of recurrence of slipping of the vehicle wheels 6 is minimized.

In the event, however, that the vehicle wheel 6 should again begin to slip, the trigger pipe 19 is again vented to atmosphere as previously described and the valve unit 12 again operates to equalize the fluid pressure on the usual pressure side of the brake cylinder piston into the space on the usual non-pressure side of the brake cylinder piston and thus again effects release of the brakes.

When, due to the release of the brakes, the vehicle wheel 6 again returns to a speed corresponding substantially to vehicle speed and the valve unit 12 operates to release fluid under pressure from the usual non-pressure side of the brake cylinder piston to effect reapplication of the brakes, the degree of the application is further reduced from that which initiated the slipping of the wheel to a degree corresponding to the pressure remaining on the pressure side of the brake cylinder piston.

In the event that the vehicle wheel 7 begins to slip with respect to the vehicle wheel 6 during an application of the brakes, a partial vacuum is produced in the discharge chamber 46 as previously explained and, as a result, the pin valve 61 on the piston valve 59 is unseated and the trigger pipe 19 is similarly vented to atmosphere through the exhaust port 65. The valve unit 12 is thus first operated to effect the release of the brakes before the vehicle wheel 7 can attain the locked-wheel state and then, upon the return of the vehicle wheel 7 to a speed corresponding substantially to vehicle speed, to effect the reapplication of the brakes to a reduced degree. Obviously, when the vehicle wheel 7 returns to a speed corresponding to vehicle speed due to the release of the brakes, the pressure in the discharge chamber 46 of the pump and valve unit 15 is again increased to substantially atmospheric pressure and consequently the spring 62 reseats the pin valve 61 on the piston valve 59 so that the trigger pipe 19 may again be recharged.

When the vehicle comes to a stop and the operator desires to release the brakes prior to again starting the vehicle, he merely shifts the brake valve handle 21 to release position. In such case, the supply pipe 18 is vented to atmosphere and the valve unit 12 operated to reopen communication between the pressure side of the brake cylinder piston and the supply pipe 18 so that fluid under pressure acting on the pressure side of the brake cylinder piston is released to atmosphere at the brake valve 14.

Summary

Summarizing, it will be seen that I have disclosed a vehicle brake control equipment for guarding against sliding of the vehicle wheels due to excessive application of the brakes thereon. The equipment includes a liquid circulating system including two pumps, illustrated as of the gear type, associated respectively with the forward and the rear axle units of a vehicle wheel truck. The two pumps operate in series relation and as long as the forward and rear wheels of a vehicle truck rotate at substantially the same speed, the pressure in a chamber in the discharge line between one pump and the other is maintained substantially at atmospheric pressure. When one of the forward wheels or one of the rear wheels of the vehicle truck slips with respect to the other, an increase of pressure or a partial vacuum is produced in the chamber which is effective through suitable responsive valve devices to produce a release of the brakes on the vehicle wheels sufficiently rapidly to prevent the slipping wheels from attaining the locked-wheel state.

When the slipping wheel returns to a speed corresponding substantially to vehicle speed, the restoration of the normal atmospheric pressure in the chamber causes reapplication of the brakes to a reduced degree.

While I have shown and described only one illustrative embodiment of my invention, it will be apparent that various omissions, additions or modifications may be made therein without departing from the spirit of my invention. It is accordingly not my intention to limit the scope of my invention except as it is necessitated by the scope of the prior art.

Having now described my invention, what I claim as new and desire to secure by Letters Patent, is:

1. A vehicle brake equipment comprising means for causing application of the brakes, means for causing release of the brakes while the first said means is conditioned to cause application of the brakes, a chamber having fluid therein normally at a certain pressure, and means responsive to a certain increase or a certain decrease of fluid pressure in the said chamber with respect to said certain normal pressure for causing operation of the brake releasing means to release the brakes.

2. A vehicle brake equipment comprising means operative to effect application and release of the brakes, means operative while the first said means is conditioned to cause application of the brakes for causing release and reapplication of the brakes, means providing a chamber having fluid therein normally at a certain pressure, and means responsive to a certain increase or to a certain decrease in pressure with respect to said certain pressure in said chamber for causing said release and reapplication means to effect release of the brakes and responsive to the return of said certain pressure in said chamber for causing said release and reapplication means to effect reapplication of the brakes.

3. A vehicle brake equipment comprising means operative to cause application and release of the brakes, means for causing release of the brakes while the first said means is conditioned to cause application of the brakes, means providing a chamber having fluid therein normally at atmospheric pressure and means responsive to a certain increase in pressure or to a certain decrease in pressure with respect to atmospheric pressure in said chamber for causing operation of the brake releasing means to release the brakes.

4. A vehicle brake equipment comprising means operative to effect application and release of the brakes, means effective while the first said means is conditioned to cause application of the brakes for causing release and reapplication of the brakes, means providing a chamber having fluid therein normally at atmospheric pressure, and means responsive to a predetermined increase or decrease in pressure with respect to atmospheric pressure in said chamber for causing operation of the release and reapplication means to effect release of the brakes and responsive to the return of atmospheric pressure in said chamber for causing the release and reapplication means to effect reapplication of the brakes.

5. A vehicle brake equipment comprising means for causing application of the brakes, means for causing release of the brakes while the first said means is conditioned to cause application of the brakes, a chamber having fluid therein normally at a certain pressure, means responsive to a certain increase or a certain decrease of pressure with respect to said certain pressure in said chamber for causing operation of the brake releasing means to release the brakes, and means responsive to a certain differential of speed of one vehicle wheel over a second vehicle wheel for effecting an increase of pressure in said chamber and to a certain differential of speed of the second vehicle wheel over the said one vehicle wheel for effecting a reduction of pressure in said chamber with respect to said certain pressure.

6. A vehicle brake equipment comprising means operative to effect application and release of the brakes, means operative while the first said means is conditioned to cause application of the brakes for causing release and reapplication of the brakes, means providing a chamber having fluid therein normally at a certain pressure, means responsive to a certain increase or to a certain decrease in pressure with respect to said certain pressure in said chamber for causing said release and reapplication means to effect release of the brakes and responsive to the return of said certain pressure of said chamber for causing said release and reapplication means to effect reapplication of the brakes, and means responsive to a certain differential of speed of one vehicle wheel over a second vehicle wheel for effecting an increase in pressure in said chamber with respect to said certain pressure and to a certain differential of speed of the said second vehicle wheel over the said one vehicle wheel for effecting a reduction of pressure with respect to said certain pressure.

7. A brake equipment for a vehicle having at least two separately rotatable wheels, means for effecting an application of brakes on said wheels, means for effecting the release of the brakes from said wheels while the first said means is conditioned to effect application thereof, means providing a passage for fluid, two pumps so arranged that one pump delivers fluid into said passage and the other withdraws fluid therefrom, one of said pumps being operated according to the rotative speed of one of said wheels and the other of said pump being operated according to the rotative speed of the other of said wheels so that the fluid pressure in said passage depends upon the relative speeds at which the two pumps are operated, and means controlled according to the fluid pressure in said passage for controlling said brake releasing means.

8. A vehicle brake equipment comprising means for effecting application of the brakes, means for effecting release of the brakes while the first said means is conditioned to effect application of the brakes, a fluid circulatory system including two pumps operative respectively according to the rotative speeds of two different vehicle wheels, and means responsive to variations of pressure in the system due to operation of the two pumps at different speeds for controlling the brake releasing means.

9. A vehicle brake equipment comprising means for effecting application of the brakes, means for effecting release and reapplication of the brakes while the first said means is conditioned to effect application of the brakes, a fluid circulatory system including two pumps operative respectively according to the rotative speeds of two different vehicle wheels, the pressure in a certain portion of said system being normally substantially at atmospheric pressure as long as the two pumps operate at substantially the same speed and increasing or decreasing with respect to atmospheric pressure when one of the pumps is operated at a speed different from the other, and means responsive to variations of the pressure in said portion of the system above or below atmospheric pressure for causing operation of the release and reapplication means to effect release of the brakes and responsive to the restoration of atmospheric pressure in said portion of the system for causing operation of the release and reapplication means to effect reapplication of the brakes.

10. A vehicle brake equipment comprising means for effecting application of the brakes, means for effecting release of the brakes while the first said means is conditioned to effect application of the brakes, a fluid circulatory system including two pumps operative respectively according to the rotative speeds of two different vehicle wheels, means responsive to variations of pressure in a certain portion of the system due to operation of the two pumps at different speeds for controlling the brake releasing means, and means for preventing a substantial variation from the normal pressure carried in the said certain portion of the circulatory system as long as the difference in the speed of operation of the two pumps does not exceed a certain amount of speed.

11. A vehicle brake equipment comprising means for effecting application of the brakes, means for effecting release of the brakes while the first said means is conditioned to effect application of the brakes, a fluid circulatory system including two pumps operative respectively according to the rotative speeds of two different vehicle wheels, means responsive to variations of pressure in said system due to operation of the two pumps at different speeds for controlling the brake releasing means, and means for limiting the increase of pressure in said system to a certain uniform pressure.

12. A vehicle brake equipment comprising means for effecting application of the brakes, means for effecting release of the brakes while the first said means is conditioned to effect application of the brakes, a fluid circulatory system including two pumps operative respectively according to the rotative speeds of two different vehicle wheels, said pumps being effective to maintain a certain normal pressure in said system as long as they operate at substantially the same speeds and effective to cause an increase or a decrease in pressure with respect to the normal pressure when one of the pumps operates faster than the other, means responsive to a predetermined increase of the pressure in said system above the normal pressure for effecting operation of the brake releasing means to effect release of the brakes, and means responsive to a predetermined decrease of pressure in said system below the normal pressure carried therein to also cause said brake releasing means to effect release of the brakes.

13. A vehicle brake equipment comprising means for effecting application of the brakes, means for effecting release of the brakes while the first said means is conditioned to effect application of the brakes, a fluid circulatory system including two pumps operative respectively according to the rotative speeds of two different vehicle wheels and arranged in series relation so that the fluid discharge of one pump is delivered to the intake passage of the other, said pumps being effective when operated at substantially the same speeds for maintaining a substantially unvarying normal pressure in a portion of the system between the discharge of the said one pump and the intake of the said other pump, effective when the said one pump operates at a higher speed than the said other pump to effect an increase of pressure in the said portion of circulatory system, and effective when the said one pump operates at a slower speed from the said other pump to produce a partial vacuum in the said portion of the circulatory system, and means responsive to a predetermined pressure or to a predetermined partial vacuum in the said portion of the circulatory system for causing operation of the brake releasing means to effect release of the brakes.

14. A vehicle brake equipment comprising a brake cylinder having therein a piston and two chambers located respectively on opposite sides of the piston, means for causing fluid under pressure to be supplied to one of said chambers to cause movement of the piston to effect application of the brakes, valve means operative to connect said two chambers to equalize the fluid pressure on opposite sides of the piston and thereby effect release of the brakes, and means responsive to a certain differential in the rotative speeds of two different vehicle wheels for causing operation of the valve means.

15. A vehicle brake equipment comprising a brake cylinder having therein a piston and two chambers located respectively on opposite sides of the piston, valve means normally conditioned to establish communication through which fluid under pressure may be supplied to one of said chambers to cause movement of the piston to effect application of the brakes and operative to close said communication and establish communication between the said two chambers to effect equalization of fluid pressures on opposite sides of the said piston and thereby effect release of the brakes, and means responsive to a certain differential of rotative speeds of two different vehicle wheels to effect operation of the valve means to establish communication between the two chambers.

16. A vehicle brake equipment comprising a brake cylinder having therein a piston and two chambers located respectively on opposite sides of the piston, means for causing fluid under pressure to be supplied to one of said chambers to cause movement of the piston to effect application of the brakes, valve means operative to establish communication between said two chambers to effect equalization of the fluid pressures on opposite sides of the piston and thereby effect release of the brakes, a fluid circulatory system including two pumps operative respectively according to the rotative speeds of two different vehicle wheels, said pumps being effective when operated at different speeds to effect an increase or decrease of the pressure in the circulatory system from a certain normal pressure carried therein, means responsive to a predetermined variation above or below the certain normal pressure in the circulatory system for effecting operation of said valve means.

17. A vehicle brake equipment comprising means for effecting application of the brakes, means for effecting release of the brakes while the first said means is positioned to effect application of the brakes, a chamber, two pumps operative respectively according to the rotative speeds of two separately rotatable vehicle wheels, said pumps being effective to cause an increase of pressure or a decrease of pressure from a certain normal pressure in said chamber upon the occurrence of a difference in the rotative speeds of said two wheels, means responsive to a predetermined increase or a predetermined decrease from the normal pressure in said chamber for causing said brake releasing means to operate to effect release of the brakes, and means for preventing such predetermined increase or decrease from the normal pressure in said chamber unless the difference in the rotative speeds of said two wheels exceeds a certain amount.

18. A vehicle brake equipment comprising means for effecting application of the brakes, means for effecting release of the brakes while the first said means is conditioned to effect application of the brakes, two pumps operative respectively according to the rotative speeds of two separately rotatable vehicle wheels, means providing two fluid passages between said pumps, fluid being delivered from one of said pumps through one of said passages to the other of said pumps and from the other of said pumps through the other of said passages to the said one pump, said pumps being effective when the corresponding vehicle wheels are rotated at different speeds to cause an increase or a decrease in the normal pressure existing in said one passage, means responsive to a predetermined increase or to a predetermined decrease from the normal pressure in said one passage for causing operation of the said brake releasing means to effect release of the brakes, and means providing communication between said two passages for the flow of fluid in either direction therebetween to prevent substantial variation from the normal pressure in said one passage unless the difference between the rotative speeds of the two vehicle wheels exceeds a certain amount.

19. A vehicle brake equipment comprising means for causing application of the brakes, means operative to cause release of the brakes while the first said means is conditioned to cause application of the brakes, a chamber containing liquid normally at a certain pressure, means responsive to the occurrence of a differential between the rotative speed of one vehicle wheel and the rotative speed of a second vehicle wheel for effecting an increase of liquid pressure in said chamber, means responsive to a predetermined increase of liquid pressure in said chamber for causing operation of the brake release means to release the brakes, and means for releasing air trapped in said chamber by the liquid.

BURTON S. AIKMAN.